United States Patent
Saraf et al.

(10) Patent No.: US 9,152,802 B2
(45) Date of Patent: Oct. 6, 2015

(54) AUTOMATION TOOL FOR PROVIDING USERS WITH SECURITY ACCESS TO AN ELECTRONIC SYSTEM

(75) Inventors: Sachin Saraf, Vileparle(East) (IN); Anupam Pandey, Bangalore (IN)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 1932 days.

(21) Appl. No.: 12/027,458

(22) Filed: Feb. 7, 2008

(65) Prior Publication Data

US 2009/0183244 A1    Jul. 16, 2009

(51) Int. Cl.
*H04L 29/06* (2006.01)
*G06F 21/60* (2013.01)

(52) U.S. Cl.
CPC ...... *G06F 21/604* (2013.01); *G06F 2221/2101* (2013.01); *G06F 2221/2149* (2013.01)

(58) Field of Classification Search
CPC .......... G06F 21/604; G06F 2221/2101; G06F 2221/2149
USPC .......................................................... 726/6
See application file for complete search history.

(56) References Cited

U.S. PATENT DOCUMENTS

| | | | |
|---|---|---|---|
| 7,484,089 B1 * | 1/2009 | Kogen et al. | 713/156 |
| 2004/0186836 A1 * | 9/2004 | Schlesinger | 707/9 |
| 2005/0086510 A1 * | 4/2005 | Nicodemus et al. | 713/200 |
| 2006/0090208 A1 * | 4/2006 | Smith | 726/26 |
| 2007/0174903 A1 * | 7/2007 | Greff | 726/6 |
| 2008/0016580 A1 * | 1/2008 | Dixit et al. | 726/27 |
| 2008/0046576 A1 * | 2/2008 | Wahl | 709/228 |

* cited by examiner

*Primary Examiner* — Jeffrey D Popham
(74) *Attorney, Agent, or Firm* — Mannava & Kang, P.C.

(57) ABSTRACT

A method for providing multiple users with security access to an electronic system is provided. The method comprising: providing a plurality of parent security roles, wherein each parent security role includes a plurality of transactions authorized to be performed in the electronic system, providing a plurality of child security roles, wherein each child security role is derived from one of the plurality of parent security roles, setting up the multiple users in the electronic system and their associated user passwords, assigning one of the plurality of child security roles to each of the multiple users to provide the multiple users with security access to the electronic system at once, and providing each of the multiple users with security access to the electronic system, via the associated user password, in accordance with the child security role assigned to the user.

22 Claims, 13 Drawing Sheets

|   | A | B | C | D | E | F | G |
|---|---|---|---|---|---|---|---|
| 1 | PARENT ROLE | CHILD ROLE | DESCRIPTION FOR CHILD ROLE | ACTION | ORG. ELEMENT | FROM | TO |
| 2 |   |   |   |   |   |   |   |
| 3 |   |   |   |   |   |   |   |
| 4 |   |   |   |   |   |   |   |
| 5 |   |   |   |   |   |   |   |

*FIG. 3B* (390)

|   | A | B | C | D |
|---|---|---|---|---|
| 1 | BAPIBNAME | ACTION | AGR_NAME | TO_DAT |
| 2 |   |   |   |   |
| 3 |   |   |   |   |
| 4 |   |   |   |   |
| 5 |   |   |   |   |

*FIG. 4B* (490)

AUTOMATION TOOL FOR PROVIDING USERS WITH SECURITY ACCESS TO AN ELECTRONIC SYSTEM

PRIORITY

This application claims the benefit under 35 U.S.C. §119 (a) of the prior-filed Indian Patent Application No. 99/MUM/2008, filed on Jan. 14, 2008 with the Indian Patent Office, and entitled, "AUTOMATION TOOL FOR PROVIDING USERS WITH SECURITY ACCESS TO AN ELECTRONIC SYSTEM," which is herein incorporated by reference in its entirety.

BACKGROUND

As its name implies, an enterprise system spans across an enterprise for use by multiple users. Examples of an enterprise include but are not limited to a company, a corporation, an organization, and any other entity that is organized with multiple users. Examples of a user in an enterprise include but are not limited to an employee, a consultant, a system administrator, and any other personnel authorized to access the enterprise application. As referred herein, an enterprise system is an electronic system that includes one or more client machines (e.g., computers, servers, computing machines, and/or processing units), networked together or otherwise in communication with one another, running or executing software application(s) therein to solve one or more enterprise problems or perform one or more desired enterprise processes or tasks. Examples of an enterprise software application include but are not limited to an enterprise resource planning (ERP) application for planning the use of enterprise-wide resources, a business intelligence application for providing report creation, data viewing, and data distribution in one or more databases of interest, and a supply chain management (SCM) application for efficiently planning, implementing, and controlling operations of the supply chain.

Because information available in an enterprise system and its operations may be proprietary to the enterprise, system security is typically implemented to ensure that only authorized users may access one or more sections (hardware and/or software) of the enterprise system. Security implementation for system users, client machines in the enterprise system, and enterprise applications therein typically involve many tasks which are repetitive and manual in nature. Furthermore, such security implementations often require experienced information technology (IT) experts or personnel. For example, typically when a new authorized user is to be added to the enterprise system, IT personnel such as a system administrator must manually enter the user's information into the enterprise system, verify the user's security status, and authorize the user to access one or more client machines and one or more software applications therein.

Consequently, in an enterprise that has multiple client machines running multiple enterprise software applications or multiple instances of a single enterprise application, security implementation can be a daunting undertaking that is repetitive, labor intensive, time consuming, and costly. Thus, proper security implementation for an enterprise system may be prohibitively high, and an enterprise may be forced to delay, shortcut, or avoid such a security implementation all together and avail its system to hacking or other attacks by unauthorized sources.

Accordingly, the conventional approach to security implementation for an enterprise system is not cost effective and may cause an enterprise to delay implementation of its software applications for better management of its operations in the fast-paced world.

BRIEF DESCRIPTION OF THE DRAWINGS

Embodiments are illustrated by way of example and not limited in the following figure(s), in which like numerals indicate like elements, in which:

FIG. 3B illustrates a spreadsheet template that may be used to create an input file for security utility illustrated in FIG. 3A, in accordance with one embodiment.

FIG. 4B illustrates a spreadsheet template that may be used to create an input file for security utility illustrated in FIG. 4A, in accordance with one embodiment;

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the embodiments.

Described herein are methods and systems that provide a security automation tool, also referred to as a security workbench, that includes various utilities for automating security tasks to implement security for an enterprise system.

Although various embodiments are described herein with reference to an enterprise system, it should be understood that such embodiments are applicable to any IT system that includes one or more client machines networked together and executing one or more software applications therein. Once deployed, the security automation tool or workbench is operable to automate security tasks to reduce effort and rework in security implementation for the enterprise system. The security workbench also allows lesser experienced personnel to work on the security tasks with minimal training.

System

Figure 1A:
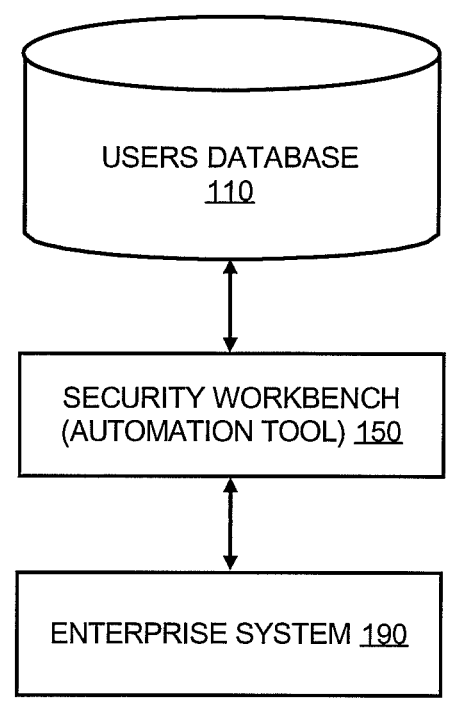
FIG. 1A illustrates a system 100 for employing a security workbench or automation tool that includes utilities for automating various security tasks, in accordance with one embodiment.

FIG. 1A illustrates a system 100 for employing a security workbench or automation tool 150 that includes utilities for automating various security tasks, in accordance with one embodiment. For example, a users database 110 stores relevant user information that may be accessed by the security workbench 150 to implement security for a desired enterprise system 190. For clarity, the users database 110 is shown as separate from the enterprise system 190. However, it should be understood that the users database 110 may reside within the enterprise system 190 along with other databases for which security is provided through automation of various security tasks by the security workbench 150 to protect such databases, and the enterprise system as a whole, against unauthorized access.

As referred herein, a database such as the users database 110 is a structured collection of records or data that is stored in a electronic storage space, such as a computer readable medium (CRM), so that such data may be queried, retrieved or accessed. Examples of a CRM include a hard disk drive, a removable storage drive representing a floppy diskette drive, a magnetic drive, a compact disk drive, a flash drive (e.g., USB drive), and the like. Other examples of a CRM include ROM (read only memory), EPROM (erasable, programmable ROM), EEPROM (electrically erasable, programmable ROM), or any other electronic, optical, magnetic, or other storage or transmission device capable of storing electronic data and providing a processor or processing unit with computer-readable or electronic-type instructions.

Figure 1B:
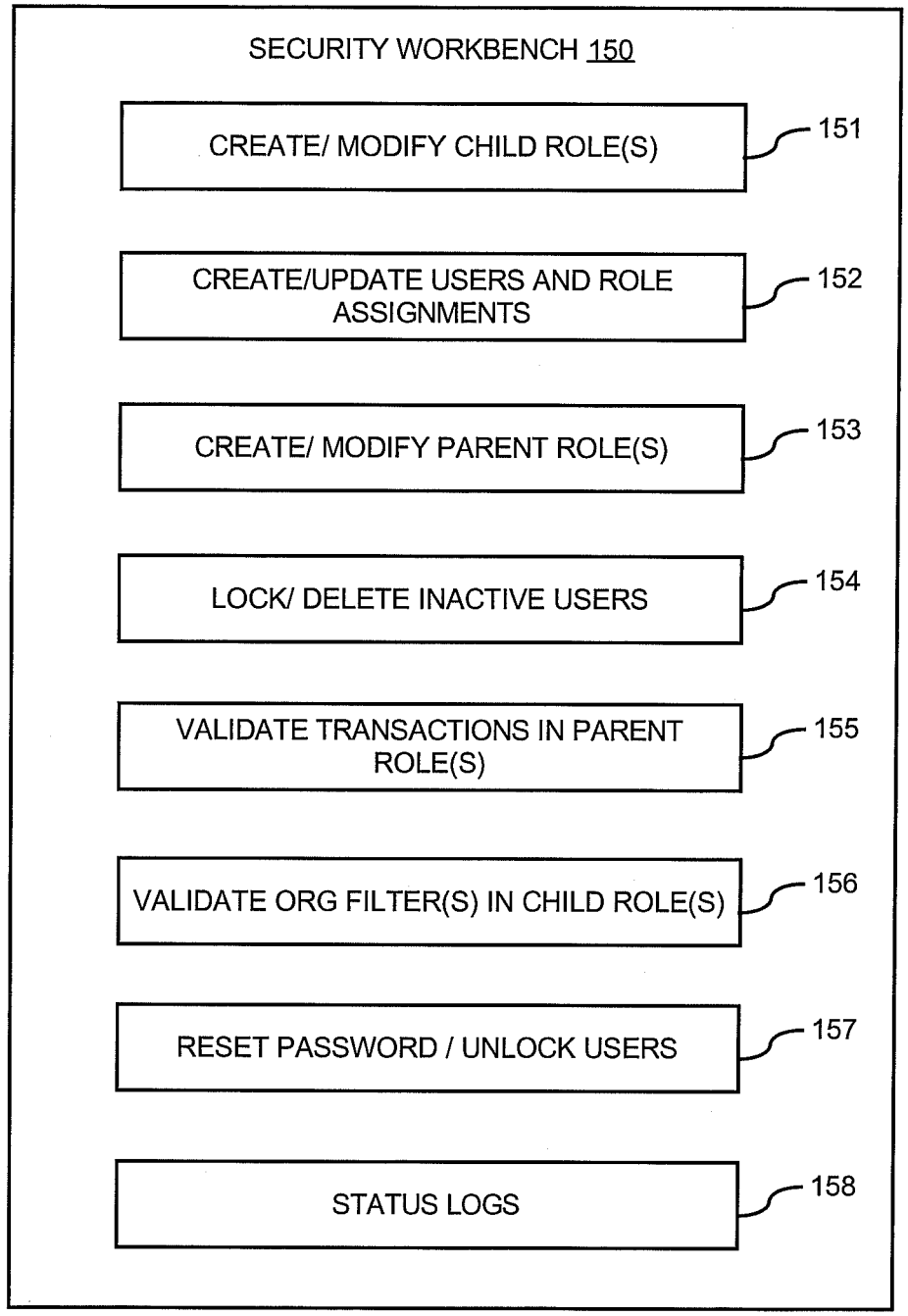
FIG. 1B illustrates a block diagram of a security automation tool, or security workbench, in accordance with one embodiment.

FIG. 1B illustrates a block diagram of the security automation tool, or security workbench, 150 that provides operators such as an enterprise system administrator with a simpler, time-saving approach to implementing security tasks for authorizing users with security access to an enterprise system. In one embodiment, the security workbench provides an operator with a user interface, such as a graphical user interface (GUI), wherein the operator is able to select options for one or more of the following security utilities or functionalities: create and modify (or update) a child security role 151, create/update users and role assignments 152, create and modify a parent security role 153, lock and delete inactive users 154, validate transactions in a parent role 155, validate organizational filters in a child security role 156, reset user password 157, and status logs 158. For example, the GUI is similar to the block diagram 150 illustrated in FIG. 1B, wherein each security functionality block is a button on which the operator can click or depress to select the respective functionality. Thus, in FIG. 1B, the label 150 refers to both the GUI and the underlying security workbench. The security workbench 150 includes one or more software programs, modules, or routines computer-coded to perform the aforementioned functionalities. Each of these security functionalities is further described below with reference to the flow diagrams illustrated in FIGS. 3-9. As referred in later discussions of such flow diagrams, whenever the security workbench 150 prompts an operator for one or more actions, its GUI is operable to provide an audio and/or visual interface, such as a graphic screen like a webpage, that audibly or textually prompts the operator to perform one or more actions. For illustrative purposes only and not to be limiting thereof, the methods as illustrated in FIGS. 3-9 are discussed in the context of the system 100 illustrated in FIGS. 1A-B.

Figure 2:
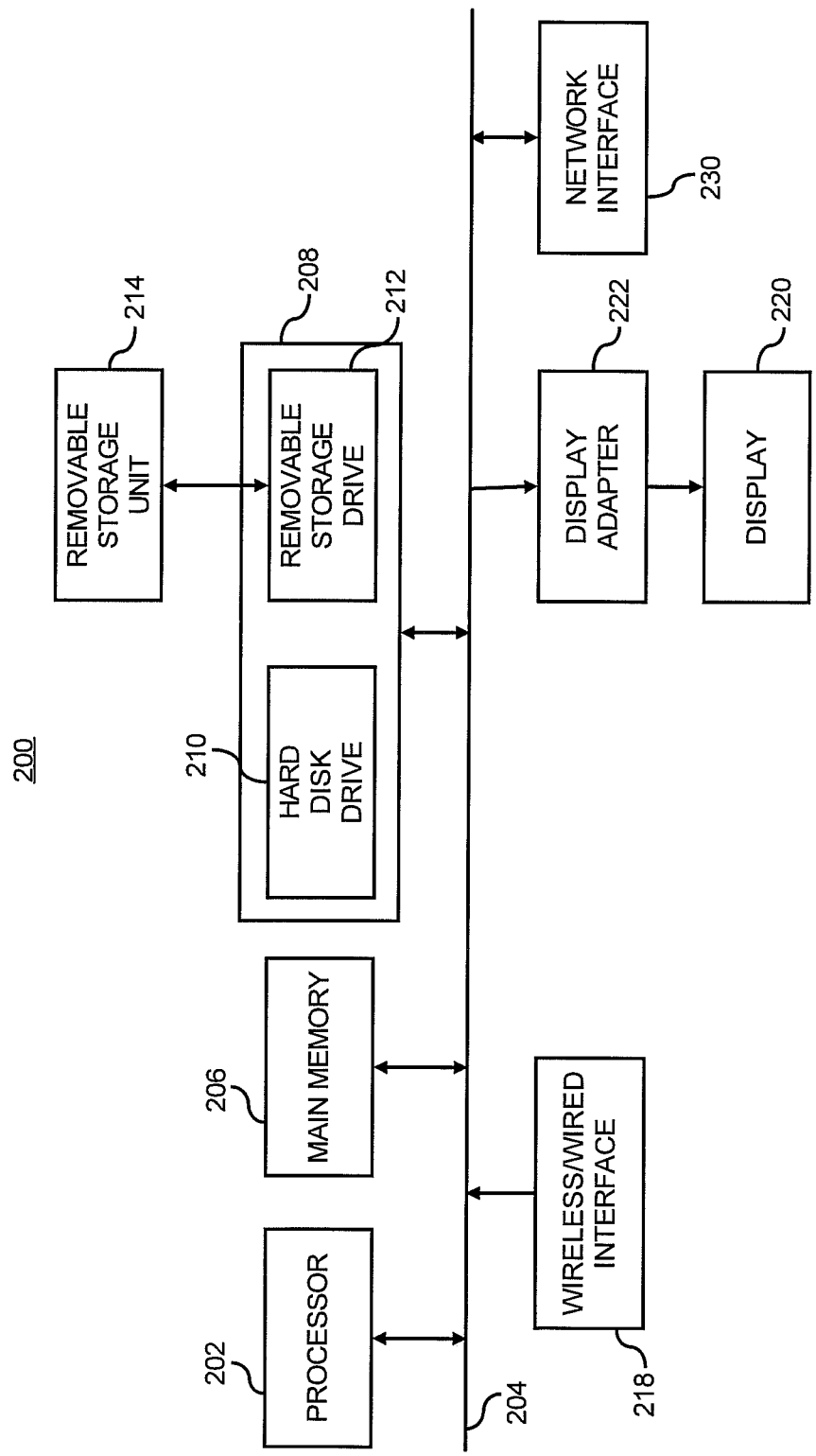
FIG. 2 illustrates a block diagram of a platform for implementing a security workbench or the entire system in FIG. 1A, in accordance with one embodiment.

FIG. 2 illustrates a block diagram of a computerized system 200 that is operable to be used as a platform for implementing the security workbench or automation tool 150 and its functions as illustrated in FIG. 1B. Alternatively, the computerized system 200 is operable as a platform for implementing the entire system 100 or each client machine in an enterprise system.

The computer system 200 includes one or more processors, such as processor 202, providing an execution platform for executing software. Thus, the computerized system 200 includes one or more single-core or multi-core processors of any of a number of computer processors, such as processors from Intel, AMD, and Cyrix. As referred herein, a computer processor may be a general-purpose processor, such as a central processing unit (CPU) or any other multi-purpose processor or microprocessor. A computer processor also may be a special-purpose processor, such as a graphics processing unit (GPU), an audio processor, a digital signal processor, or another processor dedicated for one or more processing purposes. Commands and data from the processor 202 are communicated over a communication bus 204 or through point-to-point links with other components in the computer system 200.

The computer system 200 also includes a main memory 206 where software is resident during runtime, and a secondary memory 208. The secondary memory 208 may also be a CRM as described earlier that may be used to store software programs, applications, or modules (one or more for each of the security utilities as described later) for the security workbench 150, software applications such as enterprise applications to be accessed by enterprise users, the users database 110, or any combination thereof. Thus, the CRM is operable to store software programs, applications, or modules that implement the methods 300-700 as described later. The main memory 206 and secondary memory 208 (and an optional removable storage unit 214) each includes, for example, a CRM. The computer system 200 includes a display 220 connected via a display adapter 222, user interfaces comprising one or more input devices 218, such as a keyboard, a mouse, a stylus, and the like. However, the input devices 218 and the display 220 are optional. A network interface 230 is provided for communicating with other computer systems via, for example, a network.

Process

Figure 3A:
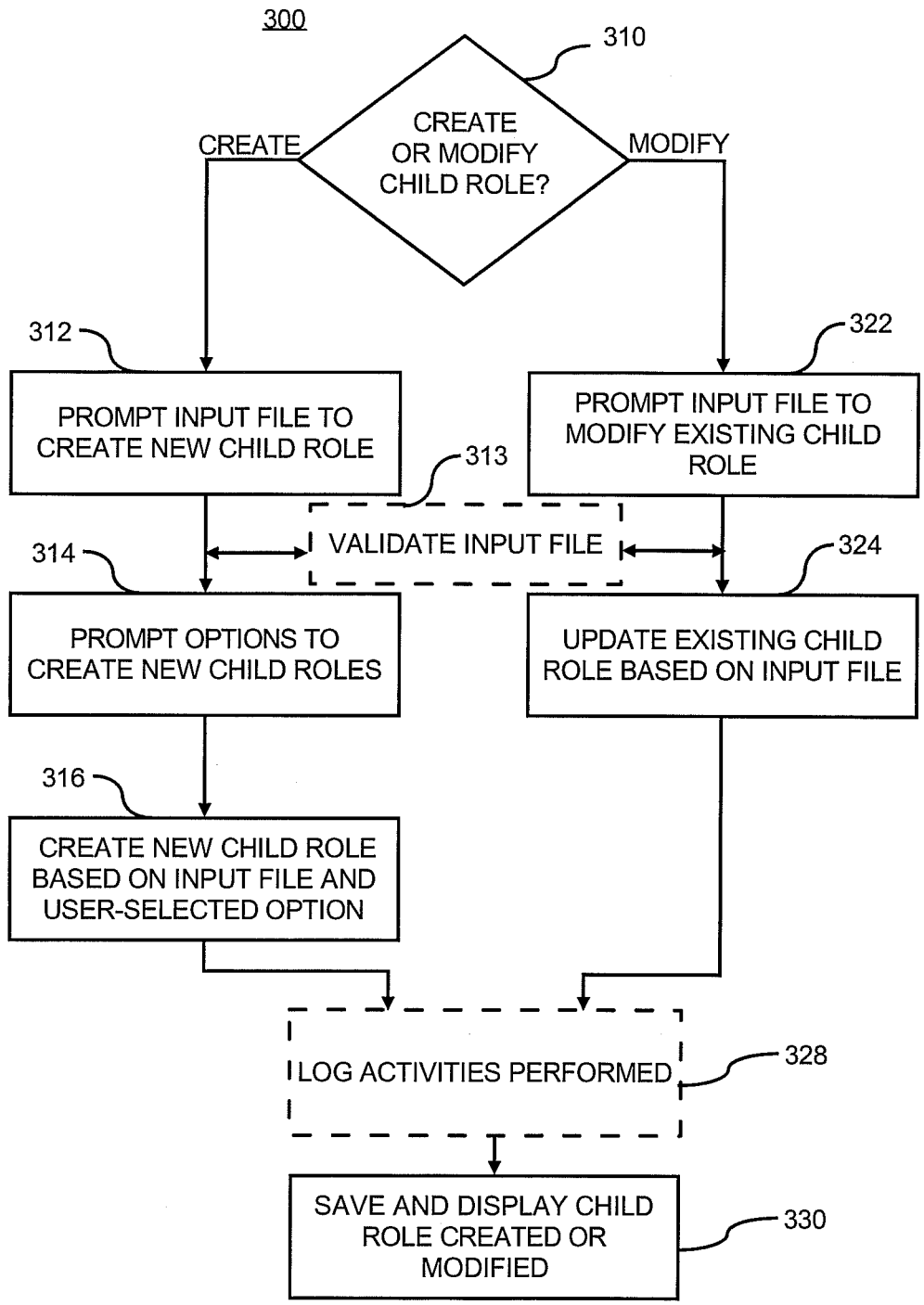
FIG. 3A illustrates a flow diagram of a security utility for creating, modifying, and otherwise updating security roles for users, in accordance with one embodiment.

FIG. 3A illustrates a flow diagram 300 implemented by a security utility 151 (FIG. 1) for creating, modifying, and otherwise updating child security roles for users to access an enterprise system, in accordance with one embodiment. A user's security role is a child security role (hereinafter, "child role") that is created based on a given or predetermined master or parent security role (hereinafter, "parent role"), as further described later. As referred herein, a security role (parent or child) contains authorization data to indicate or specify a user's authorization to access one or more areas of a system. Thus, a security role may include transactions on which authorization data is based. As referred herein, a transaction that is assigned for execution or performed by a security role (parent or child) is any activity or task authorized for execution or performance in the enterprise system by a user having such a security role. Thus, examples of a transaction include but are not limited to a financial transaction that is executable by the software application to perform a financial exchange, database transaction that interacts with a database to read or write desired data for data processing, and any other processing transaction that is executable in the enterprise system to compute, correlate, or otherwise process data.

Typically, security implementation for an enterprise system involves use of security templates which are used for deriving security roles for the application roll-outs based on some desired criteria. For example, different security templates are used for the roll-outs of software applications or client machines to different geographic locations in an enterprise system, such that different security roles are given to application users in different geographic locations to access different software applications, different portions of the same software application, or different client machines in the enterprise system. Thus, the creation of new security roles or the updating of such roles for users is one of the most frequently-used security tasks for an enterprise system roll-outs. Accordingly, automation of this task by the security workbench 150 saves considerable effort and time and reduce rework and can be handled by lesser experienced personnel. It also eliminates human errors that are often found typical manual creation of security roles for users, increases the satisfaction of enterprise users.

At 310, when an operator clicks on the button 151 of the GUI for the security workbench 150 to create/modify a child role, the security workbench provides the operator with an option to either create a new child role or modify an existing child role.

At 312, if the operator elects to create a new child role, the security workbench 150 prompts the operator to provide the following inputs: a name for the new child role; an identification of an existing parent security role on which the new child role is based and from which the new child role is to inherit transactions to perform; and any organizational filter (hereinafter, "org filter") list for the new child role. The org filter list provides organizational visibility rules or authorizations to restrict users with access to certain sections or areas of the enterprise system for executing or performing transactions, wherein such areas may be listed as organization levels or elements in the org filter list. Thus, the org filter list may put further restrictions on the authorization data found in the parent role from which the child role is derived. For example, based on a user identification (user ID), the user is allowed access to enterprise applications or client machines belonging to a given plant(s) at a first enterprise level, a given distribution channel(s) at a second enterprise level, a given sale organization(s) at a third enterprise level, a given warehouse(s) at a fourth level, and a given company code(s) at a fifth level. In one embodiment, the security workbench 150 enables the operator to upload an input file that includes the aforementioned inputs. For example, the input file may be a spreadsheet file that includes the aforementioned inputs.

FIG. 3B illustrates a spreadsheet template 390 that the operator may use to create the input file, which may be saved in the users database 110 (FIG. 1A) and subsequently uploaded to the security workbench 150. As shown in the spreadsheet template 390, the parent security roles are listed under column A, the child roles that are based on the corresponding parent security roles are listed under column B, a description for each child role is listed under column C, an action to insert (i.e., create) the child role is listed under column D, the organization element for org filtering is listed under column E, and the value ranges (low and high) for the organization elements are listed in columns F and G. If an organization element has a single value instead of a value range, the value may be entered under column F (or column G based on the desired setup of the input file).

At 313, in one embodiment, the security utility 151 optionally verifies or validates the input file as received at 312. For example, in the case of a child role creation, the security utility 151 may verify that there exists a parent role as specified in the input file on which the new child role is based, as listed under column A in the input file template shown in FIG. 3B. If no such parent role exists, the security utility 151 prompts the operator to correct the error and re-run. It should be understood that any information stored in the input file and related to the creation of a child role may be verified or validated at this juncture.

At 314, the security workbench 150 provides the operator with three options to create the new child role. The first option enables the operator to create the new child role with empty values for its organization elements. The second option enables the operator to create the new child role with all of its organization elements filled with predetermined values, for example, the wildcard value "*" to indicate all possible values for the organizational filter. The third option enables the operator to create the new child role with the organization element values inherited from the parent role. Accordingly, these three options allow the operator to fill in values for organization elements of a newly created child role in instances where the input file does not include the organization values, or such values are otherwise missing (e.g., the input file does not have values listed under columns F and G in the file template 390 shown in FIG. 3B).

At 316, the security workbench 150, through its security utility 151, automatically creates the new child role based on the input file and one of the three options selected by the operator for the security role creation.

At 322, if the operator elects to update an existing child role, the security workbench 150 also prompts the operator to provide the following inputs: an identification such as the name of the existing child role to be modified and an org filter list to update or modify the existing child role. It should be noted that because the to-be-modified child role already exists, there is no need for the operator to input the parent security role from which the child role may be based. Again, in one embodiment, the security workbench 150 enables the operator to upload an input file that includes the aforementioned inputs. For example, the uploaded input spreadsheet file used to create a child role (based on the template 390 illustrated in FIG. 3B) also may be used to modify an existing child role, wherein the action listed in column D indicates an overwrite (i.e., modification or updating) of the existing child role listed in column B, and there is no need to specify the parent role in column A for the existing child role.

Again, in one embodiment, at 313, the security utility 151 optionally verifies or validates the input file as received at 322. For example, in the case of a child role modification, the security utility 151 may verify that there exists a child role as specified in the input file for modification, as listed under column B in FIG. 3B. If no such child role exists, the security utility 151 prompts the operator to correct the error and re-run. It should be understood that any information stored in the input file and related to the modification of a child role may be verified or validated at this juncture.

At 324, the security workbench 150 automatically updates one or more existing child roles based on the input file. As discussed earlier at 314, the various options for filling in values for organization elements of the existing child roles also may be provided to the operator at this point to take care of any missing organization element values.

At 328, optionally, activities, actions, or operations performed by the security utility 151 may be logged with date and time stamps in the enterprise system 190 for record keeping purposes. For example, actions such as child role creations and modifications by operators may be logged to record when those actions were performed and by which operators, and what input files were used for such actions. The operator may be provided with the log.

At 330, the security workbench 150 is operable to save the created or updated child role in, for example, the users database 110 (FIG. 1A) and also displays the child role(s) created or modified. Optionally, prior to saving and displaying the created or modified child role(s), the security workbench 150 may perform a validation check to ensure that there are no errors with the security role creation or modification. For example, in the case of a child role creation, a validation check may be performed to determine whether the new child role includes all organization elements and corresponding organization values as provided by the input file. In another example, in the case of a child role modification, a validation check may be performed to determine whether the modified child role includes all changes as specified in the input file. If there is an error, the security workbench 150 is operable to display the error in place of the corresponding child role(s) created or modified. Accordingly, the create/modify child role utility 15 enables mass changes to be performed for security access to the enterprise system by authorized users.

FIG. 3A illustrates but one implementation by the security utility 151 (FIG. 1B) for creating or modifying a child security role. It should be understood that such an implementation of the flow diagram or process 300 may be extended to create multiple child security roles at once (that is, in one run or execution of the security utility 151), modify multiple child security roles at once, or create one or more child security roles and modify one or more child security roles at once. In other words, a single run or execution of the security utility 151 may serve to create one or more new child security roles, modify one or more existing child security roles, or perform any combination thereof. For example, if a user wishes to create multiple child roles at once, a single input file (or multiple input files) for all new child roles may be prompted at 312, multiple options for multiple child roles may be prompted at 314, multiple new child roles then may be created at 316, and multiple newly-created child roles may be saved and displayed at 330. Likewise, if a user wishes to modify multiple child roles at once, multiple input files may be prompted at 322, multiple child roles then may be updated at 324, and such modified child roles may be saved and displayed at 330. In yet another example, if a user wishes to create one or more child roles and modify one or more existing child roles, the role creation steps 312-330 and role-modification steps 322-330 may be performed in a single run or execution of the security utility 151.

Figure 4A:
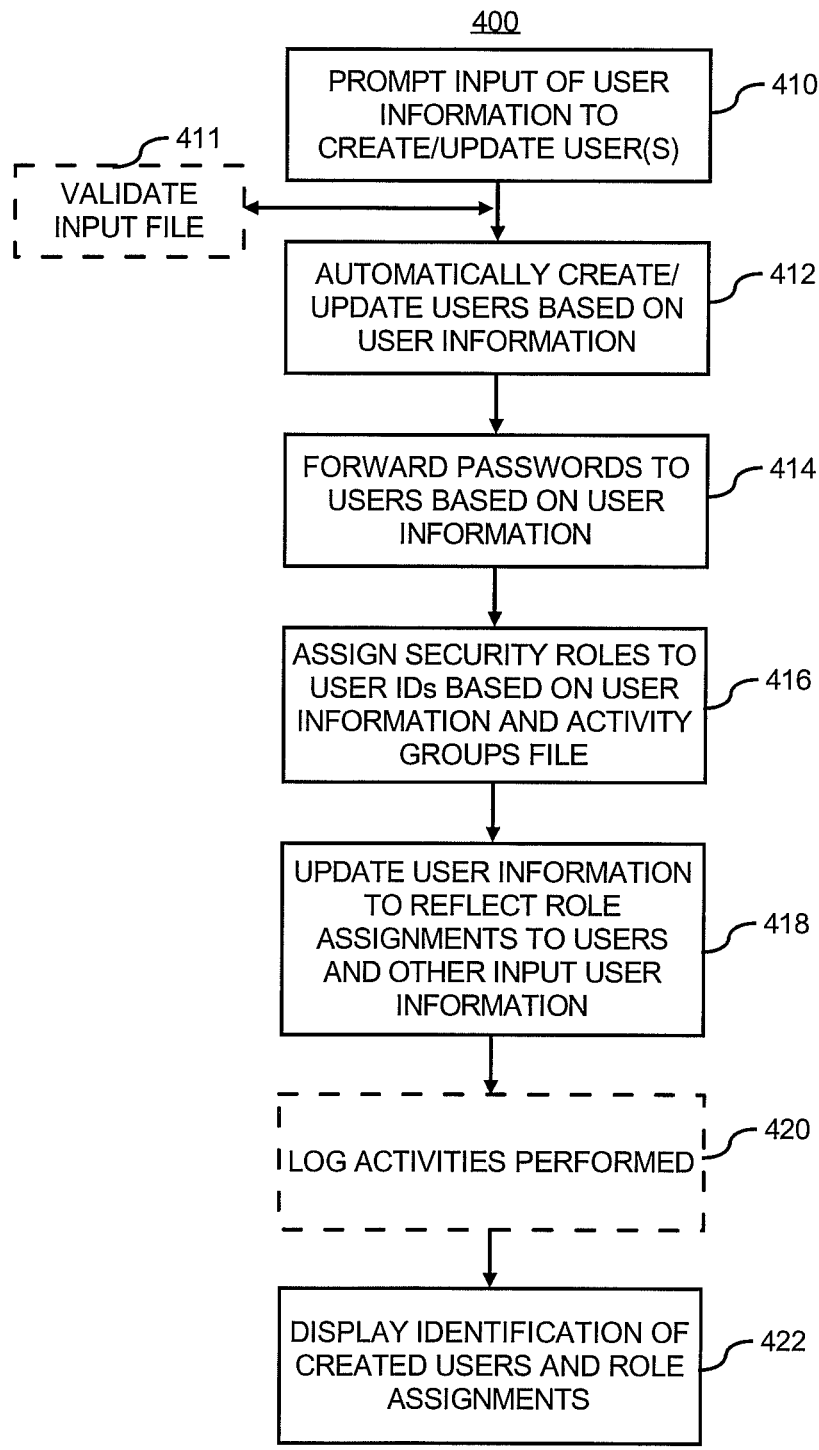
FIG. 4A illustrates a flow diagram of a security utility for creating users and assigning security roles to the users, in accordance with one embodiment.

FIG. 4A illustrates a flow diagram 400 of a security utility 152 (FIG. 1B) for creating users in the enterprise system and assigning security (parent or child) roles to the users, in accordance with one embodiment. In one embodiment, this utility is performed prior to the live implementation of the enterprise system so that authorized users can immediately access the system or any portion thereof. Typically, this utility is manually intensive when numerous users need to be set up in the enterprise system. Therefore, it is an important factor in any successful implementation of the enterprise system. Accordingly, automation of this utility in the security workbench 150 can help reduce the time required and possible human errors, which in turn help reduce production problems after a system implementation. In one embodiment, the security utility 152 provides dual functionalities: 1) to mass create one or more users that are authorized to access the enterprise system; and 2) to assign security (parent or child) roles to the authorized users with start and end validity dates.

At 410, when an operator clicks on the button 152 of the GUI for the security workbench 150 to create or update one or more users in the enterprise system (i.e., setting up the users so that they may be identified in the enterprise system to access such a system) and assign a security (parent or child) role to each user, the security workbench 150 prompts the operator to input information of users that are authorized to access the enterprise system. In one embodiment, the security workbench 150 enables an operator to upload an input file such as a spreadsheet file from, for example, the users database 110 (FIG. 1A). The input file includes the user names (e.g., full name or last name), their user IDs as identified by the enterprise system, their associated user types, their user or activity groups, their departments or organizational levels, their telephone numbers, their fax addresses, their e-mail addresses, their physical office locations, their user passwords, their validity periods for role assignments, and any other information that may identify or distinguish the user and his/her employment position and physical work location in the enterprise. For example, user types are categorized or defined in accordance with the particular enterprise system to indicate the type of a user, such as whether the user is a system administrator, an internal user (e.g., a user that is a member of the enterprise), a restricted external user (e.g., a guest user), a remote function call (RFC) of an actual human user, etc. A user or activity group groups together users with similar tasks or activities to perform in the enterprise system. Thus, the user type and user/activity group of a user provide criteria for assigning a security role to the user. Furthermore, the validity period for role assignment provides a start and end validity dates for assigning a particular security role to a particular user.

In one embodiment, the aforementioned input file may be previously created or compiled (manually or automatically) from the master user records that already exist in the enterprise system and stored in, for example, the users database 110 (FIG. 1A). In another embodiment, the security workbench 150 may prompt the operator to provide user information to create a master user record for each user, and the user record may be saved in, for example, the users database 110 (FIG. 1A). For example, the security workbench GUI may provide a screen for the user to input the above-listed user information. An input file for creating users and assigning security roles to the users is then compiled or created from the created master user records. Thus, an operator may create multiple users in the enterprise system and assign security roles to such users at once instead of having to create each user and assign a role to such a user one at a time.

In one embodiment, at 411, if an input file or information is uploaded for use by the security utility 152, the same security utility 152 optionally verifies or validates the input file as received at 410 to check for correctness of the input file. If there is an error in the input file, the security utility 152 prompts the operator to correct the error and re-input the corrected input file. For example, in the case of a user creation or child role assignment, the security utility 152 may verify that there exists a parent role as specified in the input file on which a new child role is based for assigning to the user, as listed under column A in the input file template shown in FIG. 3B. If no such parent role exists, the security utility 152 prompts the operator to correct the error and re-runs with the corrected input file. It should be understood that any information stored in the input file and related to the creation or updating of a user may be verified or validated at this juncture. For example, verification may be performed to ensure that all desired or mandatory information or fields for a child role creation (for child role assignment) is found in the input file. In another example, verification may be performed to ensure that at least some information or fields for updating a user is found in the input file. Also, in the case of a central authorization (CA) environment as described later, the logical system name for such an environment is also identified in the input file.

At 412, the security utility 152, automatically creates or updates users for accessing the enterprise system based on the received user information, including setting up user passwords.

At 414, the security utility 152 is operable to provide an option to forward user passwords to corresponding users via, for example, e-mail addresses found in the provided user information.

At 416, the security utility 152 automatically assigns a security (parent or child) role to each user ID based on the user information obtained at 410. The security role assigned to a user provides the user with authorization to access one or more areas of the enterprise system 190 with the user password. This role assignment may be an updating of a previously-assigned security role.

At 418, the security utility 152 updates the user information by updating the master user records to reflect the assignment of security roles to the users and any other input user information (in instances where the operator inputs such user information as discussed earlier). Optionally, all activities performed by the security utility 152 may be logged with date and time stamps in the enterprise system 190 for record keeping purposes.

At 420, the security utility 152 provides an option to log performed activities, actions, or operations with date and time stamps in the enterprise system 190 for record keep purposes. For example, actions such as user creations and security role assignments may be logged in the enterprise system 190 to record when such actions were performed, which user IDs were created, and which security roles were assigned to the created user IDs. The operator may be provided with the log.

At 422, the security utility 152 provides an option to display an identification of the created or updated users and their role assignments.

There are enterprise systems in which the master user records are stored centrally at one location, such as in the users database 110 (FIG. 1A) which is located at a central subsystem or server machine in an enterprise system. The central machine may be a dedicated machine for centralized administration or one of the client machines chosen to perform centralized administration. Thus, the administration of multiple users in the enterprise system is performed at the central machine to help streamline multiple users account management on different client machines in a multi-machines environment of the enterprise system. The central or parent machine is then linked with every client or child machine in both directions so that data from the master user records can be exchanged in a controlled manner. In such a centralized administration environment, the aforementioned security utility 152 of creating users and assigning child roles to the users may be performed as well with some additional steps to take into account the centralized administration environment, as illustrated in FIG. 4C and described below.

In one embodiment, the security utility 152 is executable in a central or parent machine of a centralized administration environment so as to create and update the master user records with logon data (e.g., user passwords), defaults, role assignments, etc. Concurrently, the security workbench 150 also allows the security utility 152 to be executable in a client or child machine to update the master user records, except for the role assignment to each user. Which user master record items that may be updated or modified on the client machine depend on the configuration of transactions set in the central machine for the centralized administration environment.

Figure 4C:
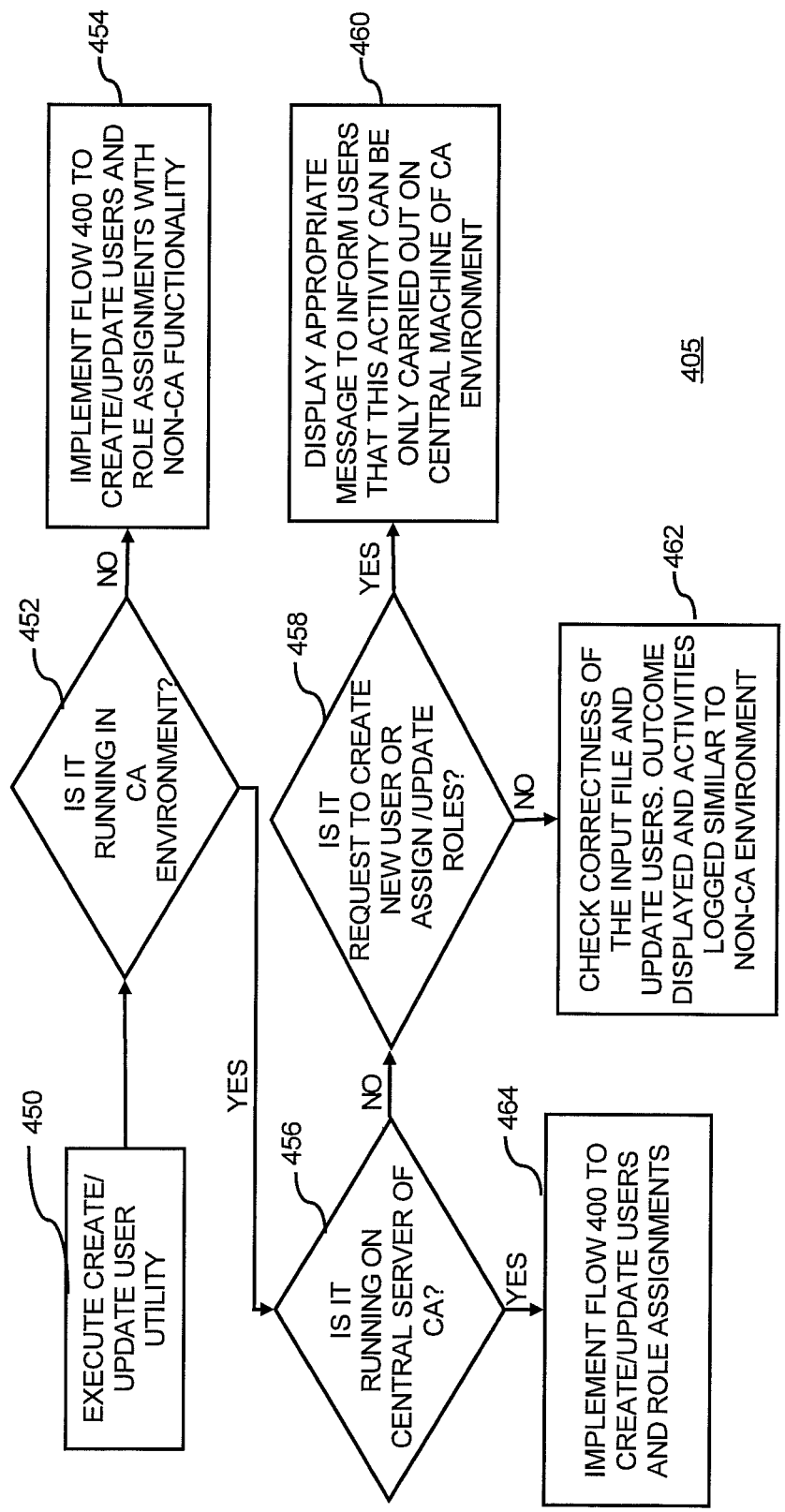
FIG. 4C illustrates a flow diagram 405 of a security utility for creating users and assigning child roles in a centralized administration (CA) environment, in accordance with one embodiment.

FIG. 4C illustrates a flow diagram 405 of the security utility 152 for creating users and assigning security (parent or child) roles in a centralized administration (CA) environment, in accordance with one embodiment. At 450, the security workbench 150 initiates the execution of the security utility 152 as illustrated in FIG. 4A, starting at 410 when an operator clicks on the button 152 (FIG. 1B) of the security workbench GUI.

At 452, however, before the execution of the process flow 400 (FIG. 4A), the security workbench 150 determines whether the security task or utility 152 is executing or running in a centralized administration environment. To perform this determination, in one embodiment, the security workbench 150 may perform a verification of the configuration of the enterprise system 190. This configuration is made available by the enterprise system 190 and includes details about the central/parent machines and child/client machines arranged in a logical system that makes up the enterprise system 190. Thus, the security workbench 150 may look up such a configuration, which confirms whether the enterprise system 190 is set up as logical system with a centralized administration environment.

At 454, if the security utility 152 is not running in a centralized administration environment, the security workbench 150 directs the security utility 152 to proceed with the implementation of the process flow 400, continuing at 411, for example, to check for the correctness of the input file, i.e., the user information or master user records, and so on through the process with non-CA functionality. That is, the process flow 400 may be implemented with activities logged and displayed on each individual system or machine in the enterprise system 190.

At 456, if the security utility 152 is running in a centralized administration environment, the security workbench 150 next determines whether it is running on a central machine of a centralized administration environment.

At 458, if the security utility 152 is not running or executing on the central machine, the security workbench 150 next determines whether the requested security utility 152 is used to assign or update a child role for a user.

At 460, if the request is indeed the security utility 152 at a client machine desiring to create a new user or assigning/updating a child role for a user, the security workbench 150 displays an appropriate message to inform the operator that such an activity is authorized only on the central machine of the centralized administration environment.

At 462, however, if the request is the security utility 152 at a client machine is to merely update or modify an existing user by updating/modifying the user master record items (without any role assignment to the user) in the central machine, the security utility 152 may check for the correctness of the input file, similar to step 411 noted above, and update/modify the users. Again, which user master record items that may be updated or modified on the client machine depend on the configuration of transactions set in the central machine for the centralized administration environment. Updated outcomes may be displayed on the screen, and activities may be logged similar to as noted above in a non-CUA environment.

At 464, referring back to the condition at 456, if the security utility 152 is running on the central machine, the security workbench 150 directs the security utility to proceed with the implementation of the process flow 400, continuing at 411, for example, to check for the correctness of the input file and so on through the process, including logging activities performed (at 420) and displaying the outcome (at 422).

At 466, the security workbench 150 proceeds to implement the process flow 400 (FIG. 4A) for the security utility 152 to create or update users and their role assignments. The security workbench 150 optionally displays the outcome to indicate which users have been created or updated.

Figure 5:
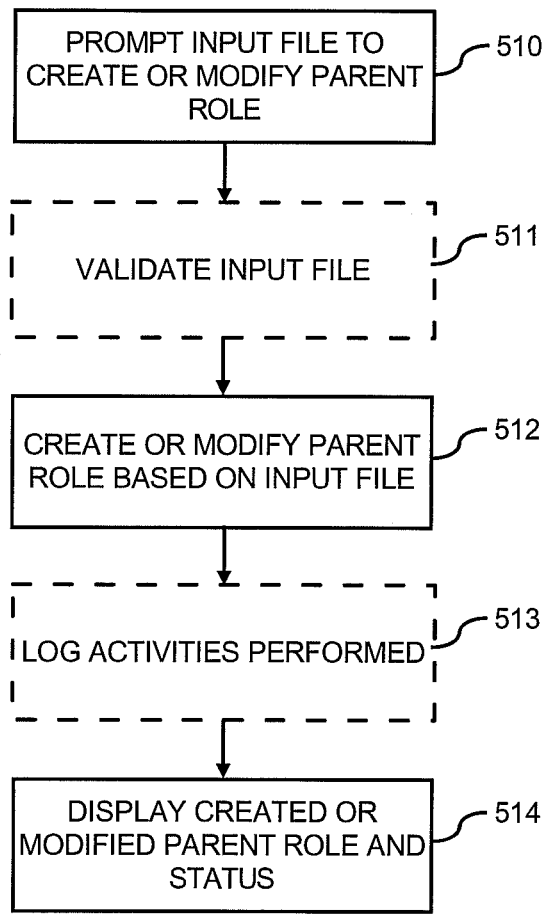
FIG. 5 illustrates a flow diagram of a security utility for creating and modifying a parent role, in accordance with one embodiment.

FIG. 5 illustrates a flow diagram 500 of a security utility 153 (FIG. 1B) for creating and modifying a parent role, in accordance with one embodiment. The security workbench 150 implements this security utility to create new parent roles and update or otherwise modify existing parent roles based on inputs of transactions, authorizations, and field values. The automation of this security utility by the security workbench 150 helps reduce effort in creating large parent roles with many associated transactions.

As referred herein, an authorization determines the functions, tasks, or activities that a user may execute or which objects the user may access. Thus, an authorization in a security role may be derived based on a transaction assigned to the security role. An authorization references an authorization object, which contains one or more authorization fields with predetermined field values to indicate authorizations (e.g., organizational levels) provided to the user to access one or more areas of the enterprise system. Thus, the user may execute those tasks or activities and access those objects in the enterprise system as defined or limited by the authorization field values.

At 510, when an operator clicks on the button 153 of the GUI for the security workbench 150 to create/modify a parent security role, the security workbench 150, through its security utility 153 for creating/modifying parent roles, prompts the operator to input a list of parent roles that are desired to be created and/or updated. For each listed parent role to be created or updated, the security workbench 150 also prompts the operator to input an associated transaction, an associated authorization object, an associated authorization object field, and an associated field value. The operator may provide the aforementioned inputs via an input file such as a spreadsheet file stored in, for example, the users database 110 (FIG. 1A) in a similar manner as illustrated in FIGS. 3B and 4B. Thus, multiple parent roles may be created and/or modified at once without the need to create or modify such roles one at a time as conventionally done.

In one embodiment, at 511, if an input file or information is uploaded for use by the security utility 153, the same security utility 153 optionally verifies or validates the input file as received at 510 to check for correctness of the input file. If there is an error in the input file, the security utility 153 prompts the operator to correct the error and re-input the corrected input file. For example, in the case of a creating a parent role, verification may be performed to ensure that all desired or mandatory information or fields for a parent role creation is found in the input file.

At 512, the security utility 153 automatically creates or modifies the list of parent roles based on the associated information received from the operator.

At 513, optionally, activities, actions, or operations performed by the security utility 153 may be logged with date and time stamps in the enterprise system 190 for record keeping purposes. For example, actions such as parent role creations and modifications by operators may be logged to record when those actions were performed and by which operators, and what input files were used for such actions. The operator may be provided with the log.

At 514, the security utility 153 is operable to display all available parent roles and their status as to whether they have been created, modified, or unchanged.

Figure 6A:
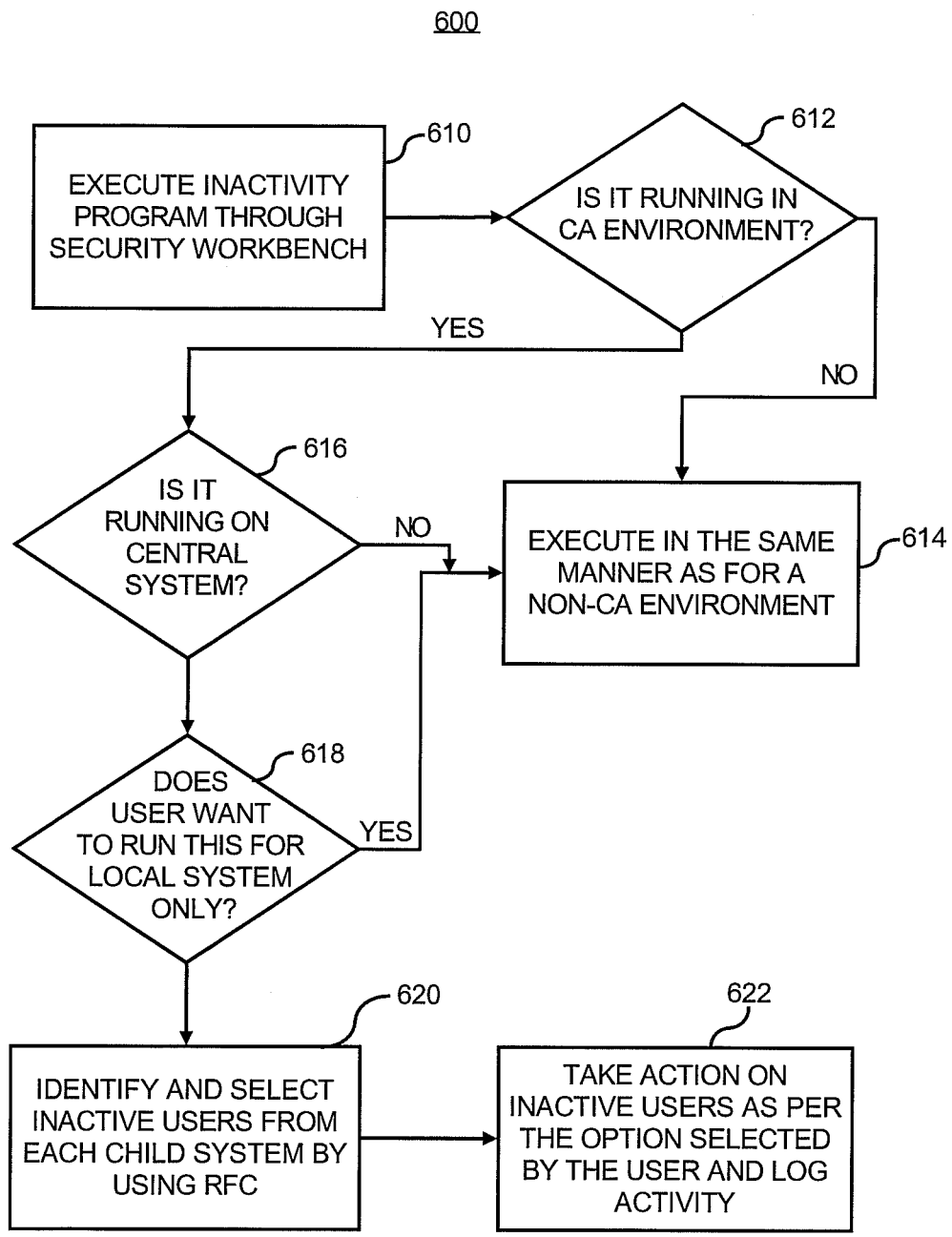
FIGS. 6A-B illustrate a flow diagram of a security utility for locking out and deleting inactive users, in accordance with one embodiment.
Figure 6B:
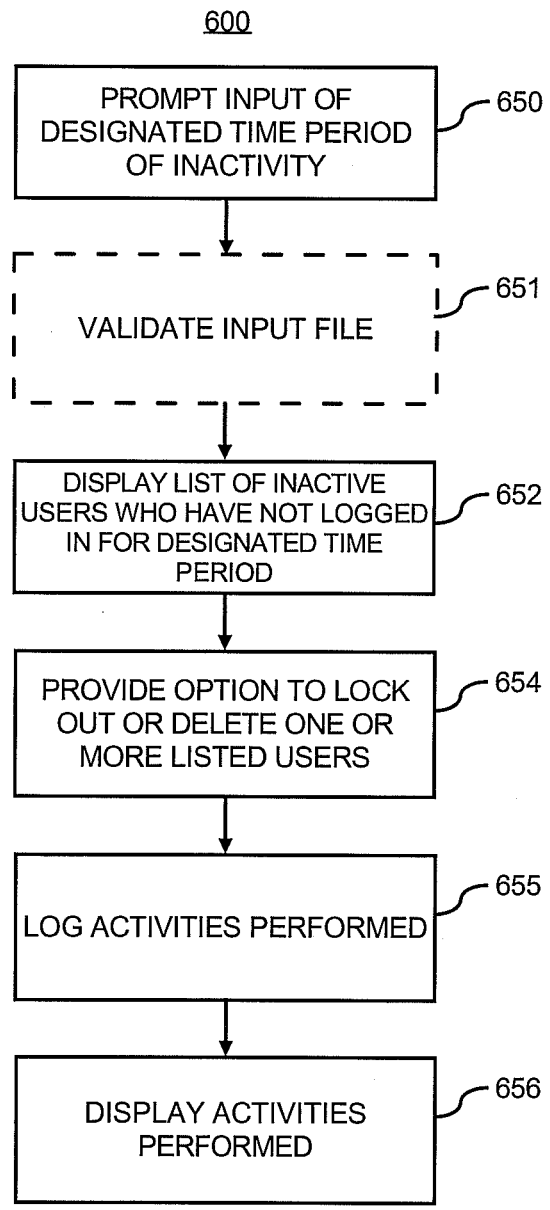

FIGS. 6A-B illustrate a flow diagram 600 of a security utility 154 (FIG. 1B) for locking out and deleting inactive users so that they no longer have access to one or more areas (hardware and/or software) of the enterprise system, in accordance with one embodiment. This security task is operable in both a centralized administration environment and a non-centralized administration environment. Conventionally, deactivating users which have not logged onto the enterprise system in a considerable time is one of the mandatory tasks for audit compliance. With the security utility 154, the security workbench 150 is operable to automatically lock out or delete those users that have been inactive for a predetermined duration of time and are thus designated as inactive users. For example, the duration may be input as a given number of days that user has not logged onto the enterprise system, and a predetermined activity may be implemented by the security utility 154 to either lock out or delete the user from one or more areas of the enterprise system. Automation by the security workbench 50 allows the security utility 154 to be scheduled and executed as a batch job, which ensures that it gets executed on a regular basis with created logs without the need of human intervention. As referred herein, locking out a user includes maintaining an identification of the user (e.g., the user master records) in the enterprise system but preventing the user from accessing the electronic system. As also referring herein, deleting a user includes removing any identification of the user from the enterprise system (e.g., removing the user master records from the electronic system) so that such a user must be created again in the future for accessing the enterprise system 190. FIG. 6A is first described below.

At 610, when an operator clicks on the button 154 of the GUI for the security workbench 150, the security workbench 150 initiates the execution of the security utility 154 to lock or delete inactive users.

At 612, the security utility 154 checks to see whether the security utility 154 is running or executing in a centralized (CA) or non-centralized (non-CA) administration environment.

At 614, if it is determined that the security utility 154 is running in a non-centralized administration environment, the security workbench 150 executes the security utility 154 in the manner for a non-centralized administration environment, i.e., in the current client or local machine.

At 616, however, if it is determined that the security utility 154 is running in a centralized administration environment, the security workbench 150 next determines whether the security utility 154 is running on the central machine or subsystem for centralized administration.

If the security utility 154 is not running on the central machine or subsystem, the security workbench 150 proceeds to execute or run the security task in the manner for a non-centralized administration environment in the current client or local system at 614.

At 618, however, if the security task is running on the central machine, the security workbench 150 prompts the operator with options to run the security utility 154 for the client subsystem only or for the entire enterprise system.

Again, if the operator elects to run the security utility 154 for the client machine or subsystem only, the security workbench 150 proceeds to execute or run the security utility 154 in the manner for a non-centralized administration environment in the current client or local machine at 614.

At 620, however, if the operator elects to run the security utility 154 for the entire enterprise system, the security utility 154 proceeds to identify inactive users from each client (or child) subsystem in the entire enterprise system 190. In one embodiment, based on the configuration of the centralized administration of the enterprise system 190, the security utility 154 may make remote function calls to each client/child subsystem to identify and select the inactive users therein.

At 622, the security workbench 150 takes action on the inactive users as per the option selected by the operator and logs the activities, actions, or operations performed. The operator may be provided with the log.

FIG. 6B illustrates the basic security task of locking out or deleting inactive users as performed by the security utility 154. This task may be performed in a non-centralized administration environment, wherein it is performed at each individual client machine in the enterprise system as desired. Also, this task may be performed in a centralized administration environment, wherein it is performed at each individual client machine as desired or at the central machine for the entire enterprise system.

At 650, the security utility 154 prompts the operator to input a desired duration of inactivity. As mentioned above, for example, the duration may be a given number of days that a user has not logged onto a system. Again, the operator may provide the aforementioned inputs via an input file as described earlier.

In one embodiment, at 651, if an input file or information is uploaded for use by the security utility 154, the same security utility 154 optionally verifies or validates the input file as received at 650 to check for correctness of the input file. If there is an error in the input file, the security utility 154 prompts the operator to correct the error and re-input the corrected input file. For example, verification may be performed to ensure that a preset or given time duration of inactivity is found in the input file.

At 652, the security utility 154 generates and displays a list of users who have been inactive, for example, who have not logged in for the desired duration, or time period, as input.

At 654, the security utility 154 provides the operator with an option (or prompts the operator to select) to lock out or delete one or more of the listed inactive users. For example, the security workbench GUI may provide the operator with a screen displaying the list of inactive users with checkboxes so that some users may be excluded from user lock or deletion actions. Thus, the operator is able to select to select an action to perform at this point.

At 655, optionally, activities, actions, or operations performed by the security utility 154 may be logged with date and time stamps in the enterprise system 190 for record keeping purposes. For example, actions such as locking out certain inactive users and deleting certain inactive users by operators may be logged to record when those actions were performed and by which operators, and what input files were used for such actions. The operator may be provided with the log.

At 656, the security utility 154 displays a log of activities performed on the listed inactive users, for example, as selected by the operator. That is, the display log provides an indication as to whether the user is locked out (locally or system wide) or deleted (locally or system wide) or maintains access to the system (local or system wide).

In an alternative embodiment, in place of steps 652 and 654, the security utility 154 may automatically lock out or delete the inactive users without human intervention from the operator. Additionally, the security utility 154 is operable to provide an option to send notification via e-mail to those users in a distribution mailing list that have been locked out or deleted to notify them of their statuses. In yet another embodiment, the security utility 154 may have a test mode wherein the security utility 154 neither prompts the operator to select an action to perform on the inactive users nor automatically performs such an action. This is useful when there is a desired to identify the inactive users in the enterprise system 190 and notify them via, for example, a distribution mailing list. These inactive users are then given a chance to become active in the enterprise system 190 before they get locked out or deleted from the system.

Figure 7:
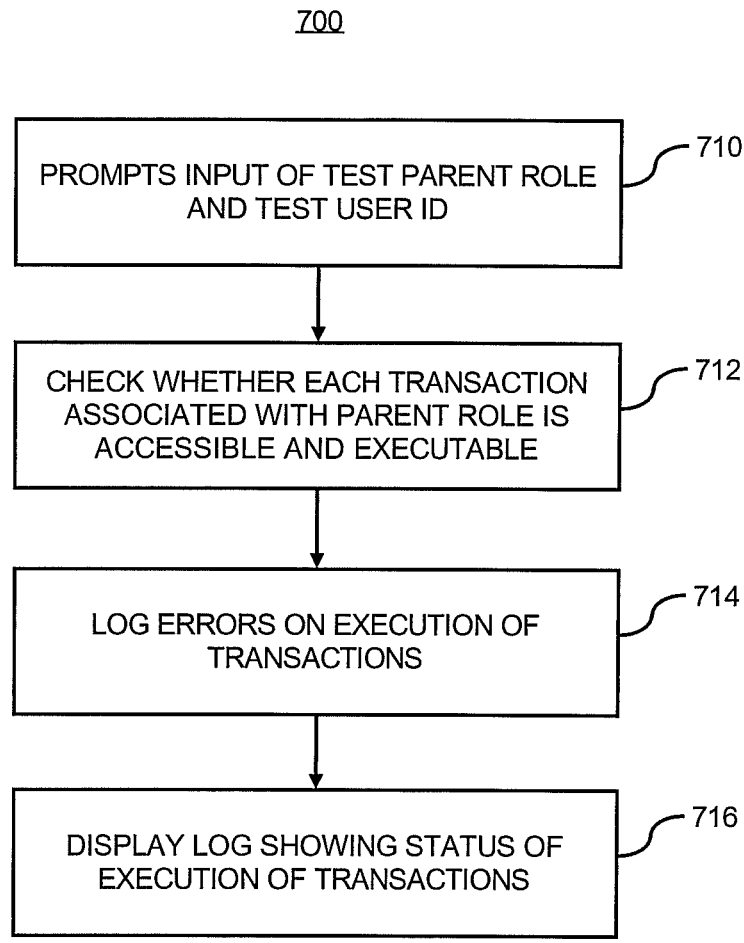
FIG. 7 illustrates a flow diagram of a security utility for validating transactions included, or authorized to be performed, in a parent role, in accordance with one embodiment.

FIG. 7 illustrates a flow diagram 700 of a security utility 155 for validating transactions included, or authorized to be performed, in a parent role, in accordance with one embodiment. As discussed earlier with reference to FIG. 5, parent security roles are created or updated by adding or removing transactions from it. Thus, verification of such changes may be desired through execution of all transactions remained in a parent role.

At 710, when an operator clicks on the button 155 of the security workbench GUI 150, the security workbench 150 prompts the operator to input the parent role to be tested and a user ID. Because the objective is to test a parent role, the transactions authorized to be performed by such a role should be executed from a user session that has the same authority as the parent role to be tested. Thus, in one embodiment, this is done by using a test user ID having the same parent role assigned.

At 712, the security utility 155 automatically checks whether each transaction of the parent role being tested is authorized to execute. For example, the security utility 155 checks whether the initial screen of each transaction is accessible for execution.

At 714, the security utility 155 logs any errors on the execution of the transactions associated with the parent role being tested.

At 716, the security utility 155 displays the log to show the status (success or error) of execution of the transactions.

Figure 8:
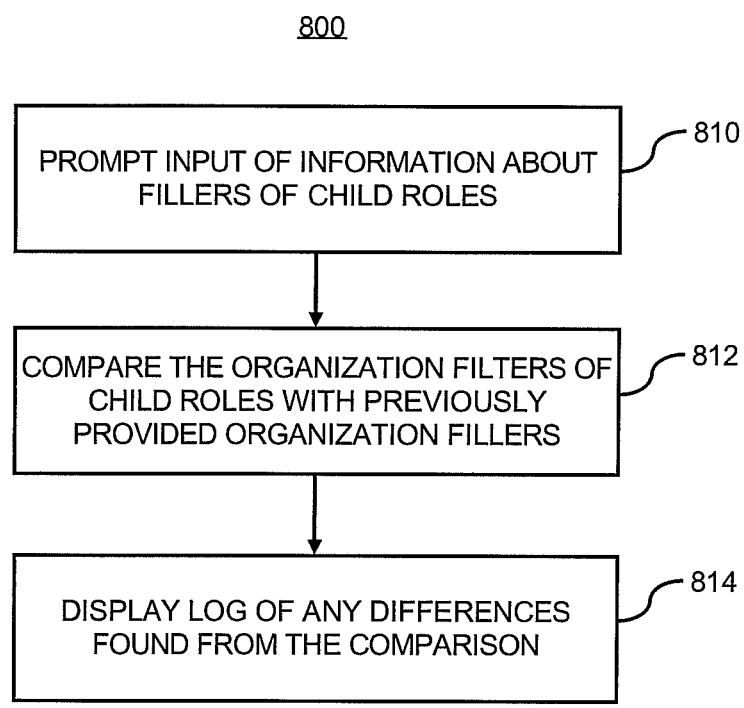
FIG. 8 illustrates a flow diagram of a security utility for validating the organizational filter for a child role, in accordance with one embodiment.

FIG. 8 illustrates a flow diagram 800 of a security utility 156 for validating the organizational filter for a child role, in accordance with one embodiment. This security utility in the security workbench 50 may be used to automate the quality check performed on a child role creation, for example, with the security utility 151 discussed earlier. It ensures that child roles which are created manually are as per the organizational filters provided in desired specifications. This helps improve the quality of deliverables and prevent unnecessary rework.

At 810, the security utility 156 prompts the operator to input information about organizational filters (organization elements and their values) of those child roles to be validated. For example, the security utility 156 is operable to allow the operator to input a file, such as a spreadsheet file, that contains organization elements associated with the child roles, and values of the associated organization elements (e.g., information in columns C, E, F, and G in FIG. 3B). Such a file may be manually or automatically compiled or created based on previously-obtained information on child roles as provided at 151 in FIG. 1B, as discussed earlier.

At 812, the security utility 156 compares the provided information of the child roles with organizational filter inputs as previously provided, for example, in the utility 151.

At 814, the security utility 156 provides a display a log of any difference or error from the comparison to indicate whether any of the organizational filter information in one or more child roles is inconsistent.

Figure 9:
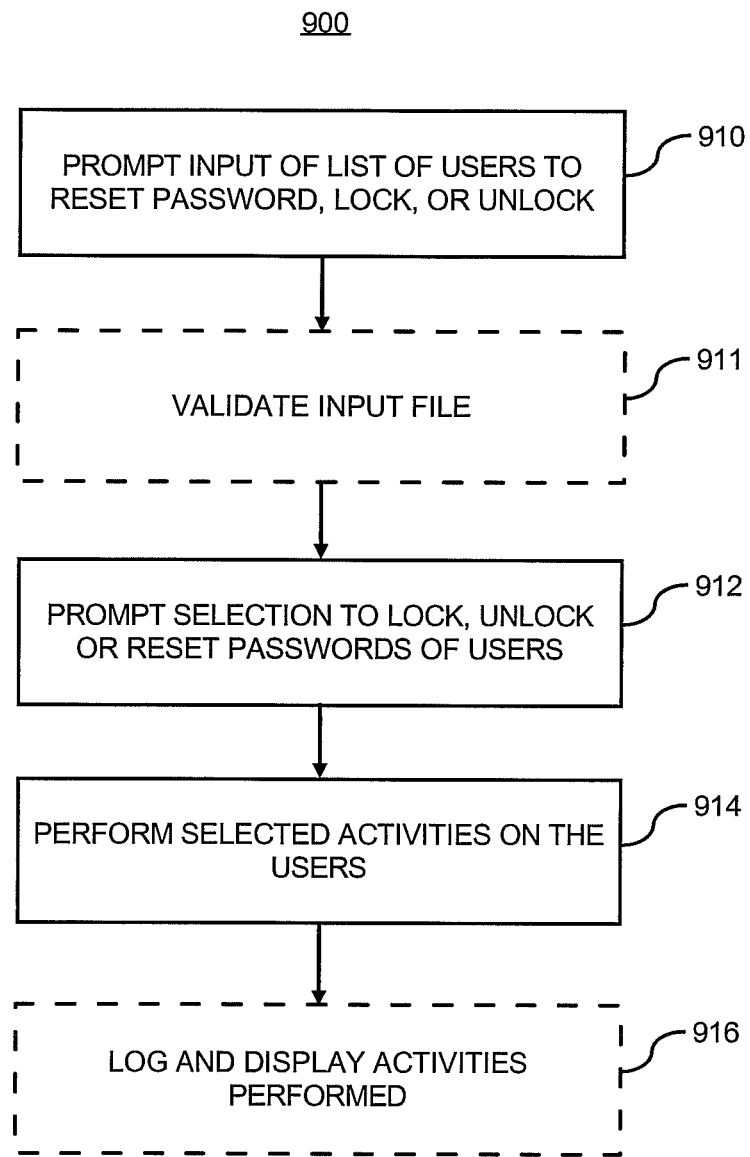
FIG. 9 illustrates a flow diagram for a security utility to reset passwords for users and unlock users, in accordance with one embodiment.

FIG. 9 illustrates a flow diagram 900 for a security utility 157 to automatically reset passwords for a list of users and unlock those users that were previously locked out, in accordance with one embodiment. New passwords may be sent individually to corresponding user email addresses. This automation minimizes the manual effort and operates in both centralized and non-centralized administration environments. In a centralized administration environment, the security utility 157 first determines whether it is being executed on the central system or a client/local subsystem and acts accordingly in a manner similar to as described in FIG. 4C.

At 910, when an operator clicks on the button 157 of the security workbench GUI, the security utility 157 prompts the operator to input information about those users desired to be unlocked or whose passwords are to be reset. For example, the security utility 157 is operable to allow an operator to input a file, such as a spreadsheet file, that includes a list of user names (and their contact information such as email addresses) that should be locked, unlocked, or have their passwords reset. Such an input file may be manually or automatically compiled or created from previously-provided information, such as information obtained from running the security utility 152 as discussed earlier.

In one embodiment, at 911, if an input file or information is uploaded for use by the security utility 157, the same security utility 157 optionally verifies or validates the input file as received at 910 to check for correctness of the input file. If there is an error in the input file, the security utility 157 prompts the operator to correct the error and re-input the corrected input file. For example, verification may be performed to ensure that user names and/or their contact information are found in the input file.

At 912, the security utility 157 provides the operator with options to lock up the listed users, unlock the listed users, reset their passwords, or any combination thereof. For example, the operator may elect to unlock the users, reset their passwords, and forward the new passwords to corresponding user email addresses. In another example, the operator may elect to only unlock the users without resetting their passwords. Thus, the unlocked users can continue to use the passwords that were in place prior to the lock-out of the users. The security utility 157 also ensures that a user ID is not locked after a password reset.

At 914, the security utility 157 automatically performs the activity or function (lock, unlock, reset password) on the users as selected by the operator. Thus, the same action or multiple different actions may be performed on multiple users at once.

At 916, optionally, activities, actions, or operations performed by the utility 157 may be logged with date and time stamps in the enterprise system 190 for record keeping purposes. Also, the logged information may be displayed. For example, those users that have their passwords unlocked and/or reset are logged and displayed. The operator may be provided with the log.

In one embodiment, the operator may analyze any of the activities or functions performed by the security utilities 151-157 by accessing a status logs utility, for example, by clicking on the button 158 of the GUI for the security workbench 150. That is because all activities performed under the utilities 151-157 are logged by the security workbench 150 as described above. By accessing the status logs 158, the operator is able to view all such activities logs.

Accordingly, as described through various embodiments herein, the security workbench 150 provides a security automation tool that is deployable with any given system, enterprise or otherwise, that have multiple users with same or different authorization levels. It eliminates the conventional requirement of manually creating or modifying each user's authorization to access a given system. Instead, it allows a system administrator or operator to mass create or update multiple users and associated security roles at once.

What has been described and illustrated herein is an embodiment along with some of its variations. The terms, descriptions and figures used herein are set forth by way of illustration only and are not meant as limitations. Those skilled in the art will recognize that many variations are possible within the spirit and scope of the subject matter, which is intended to be defined by the following claims—and their equivalents—in which all terms are meant in their broadest reasonable sense unless otherwise indicated.

What is claimed is:

1. A method for providing multiple users with security access to an electronic system, comprising:
   providing a plurality of parent security roles, wherein each parent security role includes a plurality of transactions authorized to be performed in the electronic system, and wherein providing the plurality of parent security roles comprises:
      creating at least a first one of the plurality of parent security roles, and modifying at least a second specified one of the plurality of parent security roles that already exists;
      receiving an input file that includes names of parent security roles to be created and modified, and includes a transaction associated with each of the parent security roles to be created and modified; and
      performing the steps of creating at least the first one of the plurality of parent security roles, and modifying at least the second specified one of the plurality of parent security roles simultaneously based on the input file;
   providing, using a processor, a plurality of child security roles, wherein each child security role is derived from an associated one of the plurality of parent security roles and includes an associated organizational filter list having a plurality of organization elements that modify the authorization to perform one or more of the plurality of transactions in the associated parent security role, wherein the step of providing the plurality of child security roles further comprises,
      providing a first option to fill at least one of the plurality of organization elements of one of the plurality of child security roles with empty values;
      providing a second option to fill at least one of the plurality of organization elements of the one child security role with predetermined values; and
      providing a third option to fill at least one of the plurality of organization elements of the one child security role with organization element values inherited from its associated parent security role;
   creating and setting up the multiple users in the electronic system and their associated user passwords;
   assigning one of the plurality of child security roles to each of the multiple users to provide the multiple users with security access to the electronic system at once, wherein the assigning is based on security templates specific to geographic locations of the multiple users to at least one of control access of each of the multiple users to different software applications, control access of each of the multiple users to different portions of a software application, and control access of each of the multiple users to different machines associated with the electronic system; and
   providing each of the multiple users with security access to the electronic system, via the associated user password, in accordance with the child security role assigned to the user.

2. The method of claim 1, further comprising:
identifying one or more of the multiple users who are inactive in the electronic system;
displaying a list of the one or more inactive users;
providing a first option to lock out any of the inactive users listed; and
providing a second option to delete any of the inactive users listed.

3. The method of claim 2, further comprising one of:
resetting at once the user passwords of one or more of the multiple users;
unlocking at once one or more of the inactive users that are locked out of the electronic system;
locking out at once one or more of the multiple users from the electronic system; and
any combination of the steps of resetting, unlocking, or locking.

4. The method of claim 2, further comprising:
first determining whether the three steps of identifying inactive users, providing the first option to lock out the inactive users, and providing the second option to delete the inactive users are executed in a centralized administration environment in the electronic system wherein records of the multiple users are stored at a central location in the electronic system;
upon the first determining that the three steps are executed in the centralized administration environment, second determining whether the three steps are executed at the central location in the electronic system;
upon the second determining that the three steps are executed at the central location, third determining whether the three steps are applied to users at a client location in the electronic system; and
upon the third determining that the three steps are applied to users at the client location, performing the three steps by remote function calls from the client location to the central location in the electronic system.

5. The method of claim 1, wherein the step of providing the plurality of child security roles comprises at least one of:
creating a first one of the plurality of child security roles by deriving the first one of the plurality of child security roles from one of the plurality of parent security roles; and
modifying a second one of the plurality of child security roles that already exists.

6. The method of claim 5, wherein the step of creating the first one of the plurality of child security roles comprises:
receiving an identification of one of the plurality of parent security roles from which the first child role is derived;
receiving the organizational filter list; and
creating the first child role based on the identified parent security role and the organizational filter list.

7. The method of claim 5, wherein the step of modifying one of the plurality of child security roles comprises:
receiving an identification of the second child role that already exists;
receiving a new organizational filter list that modifies a previous organizational filter list of the second child role, wherein both the previous and new organizational filter lists modify the authorization to perform the plurality of transactions provided in one of the plurality of parent roles from which the second child role is derived;
modifying the second child role based on the new organization filter list.

8. The method of claim 1, wherein setting up the multiple users in the electronic system comprises:
first receiving identifications of the multiple users to be set up;
second receiving a user type associated with an identification of each of the multiple users; and
third receiving an identification of a user group to which each of the multiple users belongs.

9. The method of claim 8, wherein the step of assigning one of the plurality of child security roles to each of the multiple users comprises:
assigning one of the plurality of child security roles to each of the multiple users based on the user type of each of the multiple users and the user group to which each of the multiple users belong.

10. The method of claim 8, wherein setting up the multiple users in the electronic system further comprises:
first determining whether the step of setting up is executed in a centralized administration environment in the electronic system wherein records of the multiple users are stored at a central location in the electronic system;
upon the first determining that the step of setting up is executed in the centralized administration environment, second determining whether the step of setting up is executed at the central location in the electronic system;
upon the second determining that the step of setting up is executed at the central location in the electronic system, performing the steps of first, second, and third receiving.

11. The method of claim 10, further comprising:
upon the second determining that the step of setting up is not executed at the central location in the electronic system, providing notification that the step of setting up must be executed at the central location.

12. The method of claim 1, further comprising:
assigning one of the plurality of child security roles with start and end validity dates.

13. The method of claim 1, further comprising:
deriving the authorization to perform a transaction in the electronic system from the transactions assigned to the parent or child security roles.

14. A computerized device for automating performance of a plurality of security tasks to provide multiple users with security access to an electronic system for security access, comprising:
a hardware processor that executes instructions to perform the following steps:
providing a plurality of parent security roles, wherein each parent security role includes a plurality of transactions authorized to be performed in the electronic system, and wherein providing the plurality of parent security roles comprises:
creating at least a first one of the plurality of parent security roles, and modifying at least a second specified one of the plurality of parent security roles that already exists;
receiving an input file that includes names of parent security roles to be created and modified, and includes a transaction associated with each of the parent security roles to be created and modified; and
performing the steps of creating at least the first one of the plurality of parent security roles, and modifying at least the second specified one of the plurality of parent security roles simultaneously based on the input file;
providing, using a processor, a plurality of child security roles, wherein each child security role is derived from an associated one of the plurality of parent security roles and includes an associated organizational filter list having a plurality of organization elements that modify the authorization to perform one or more of the plurality of transactions in the associated parent security role, wherein the step of providing the plurality of child security roles further comprises, providing a first option to fill at least one of the plurality of organization elements of one of the plurality of child security roles with empty values;

providing a second option to fill at least one of the plurality of organization elements of the one child security role with predetermined values; and providing a third option to fill at least one of the plurality of organization elements of the one child security role with organization element values inherited from its associated parent security role;

creating and setting UP the multiple users in the electronic system and their associated user passwords;

assigning one of the plurality of child security roles to each of the multiple users to provide the multiple users with security access to the electronic system at once, wherein the assigning is based on security templates specific to geographic locations of the multiple users to at least one of control access of each of the multiple users to different software applications, control access of each of the multiple users to different portions of a software application, and control access of each of the multiple users to different machines associated with the electronic system; and providing each of the multiple users with security access to the electronic system, via the associated user password, in accordance with the child security role assigned to the user.

15. The computerized device of claim 14, wherein the hardware processor further executes instructions to perform the following step:

providing a selection to create multiple new child security roles and modify multiple specified existing child security roles simultaneously.

16. The computerized device of claim 14, wherein the hardware processor further executes instructions to perform the following step:

validating the transactions included in each parent security role that are authorized to be performed in the electronic system.

17. The computerized device of claim 16, wherein the hardware processor further executes instructions to perform the following step:

validating organizational filters used to create at least one new child security role, wherein the organizational filters are used to modify the authorization to perform the one or more of the plurality of transactions in the associated parent security role on which the at least one new child security role is based.

18. The computerized device of claim 14, wherein the hardware processor further executes instructions to perform the following step:

locking out at least one of the multiple users with security access to the electronic system but designated as inactive in the electronic system and deleting from the electronic system at least one of the multiple users that is designated as inactive.

19. The computerized device of claim 18, wherein the hardware processor further executes instructions to perform the following step:

unlocking at least one of the multiple users that was previously locked out and resetting a password of at least one of the multiple users that the user uses to access the electronic system.

20. The computerized device of claim 14, wherein the hardware processor further executes instructions to perform the following step:

validating the received input file to ensure that the information therein is sufficient to perform an operation.

21. The computerized device of claim 14, wherein computerized device operates based on the received input file without an additional configuration of the computerized device from an operator.

22. A non-transitory computer readable medium on which is encoded programming code executed by a computer processor to:

provide a plurality of parent security roles, wherein each parent security role includes a plurality of transactions authorized to be performed in an electronic system, and wherein to provide the plurality of parent security roles comprises:

creating at least a first one of the plurality of parent security roles, and modifying at least a second specified one of the plurality of parent security roles that already exists;

receiving an input file that includes names of parent security roles to be created and modified, and includes a transaction associated with each of the parent security roles to be created and modified; and performing the steps of creating at least the first one of the plurality of parent security roles, and modifying at least the second specified one of the plurality of parent security roles simultaneously based on the input file;

provide a plurality of child security roles, wherein each child security role is derived from an associated one of the plurality of parent security roles and includes an associated organizational filter list having a plurality of organization elements that modify the authorization to perform one or more of the plurality of transactions in the associated parent security role, wherein the programming code executed to provide the plurality of child security roles further comprises programming code to, provide a first option to fill at least one of the plurality of organization elements of one of the plurality of child security roles with empty values;

provide a second option to fill at least one of the plurality of organization elements of the one child security role with predetermined values; and provide a third option to fill at least one of the plurality of organization elements of the one child security role with organization element values inherited from its associated parent security role;

set up multiple users in the electronic system and their associated user passwords;

assign one of the plurality of child security roles to each of the multiple users to provide the multiple users with security access to the electronic system at once, wherein the assigning is based on security templates specific to geographic locations of the multiple users to at least one of control access of each of the multiple users to different software applications, control access of each of the multiple users to different portions of a software application, and control access of each of the multiple users to different machines associated with the electronic system; and provide each of the multiple users with security access to the electronic system, via the associated user password, in accordance with the child security role assigned to the user.

* * * * *